US012173877B2

(12) United States Patent
Heijmans et al.

(10) Patent No.: US 12,173,877 B2
(45) Date of Patent: Dec. 24, 2024

(54) LED FILAMENT INTERCONNECTING RING

(71) Applicant: SIGNIFY HOLDING B.V., Eindhoven (NL)

(72) Inventors: Martinus Arnoldus Cornelis Heijmans, Veldhoven (NL); Michal Jan Horaczek, Best (NL); Jiang Hong Yu, Best (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/270,258

(22) PCT Filed: Dec. 21, 2021

(86) PCT No.: PCT/EP2021/087156

§ 371 (c)(1),
(2) Date: Jun. 29, 2023

(87) PCT Pub. No.: WO2022/148648

PCT Pub. Date: Jul. 14, 2022

(65) Prior Publication Data

US 2024/0084980 A1 Mar. 14, 2024

(30) Foreign Application Priority Data

Jan. 5, 2021 (EP) .................................... 21150271

(51) Int. Cl.
*F21V 23/02* (2006.01)
*F21K 9/232* (2016.01)
(Continued)

(52) U.S. Cl.
CPC .............. *F21V 23/02* (2013.01); *F21K 9/232* (2016.08); *F21K 9/238* (2016.08); *F21V 23/003* (2013.01);
(Continued)

(58) Field of Classification Search
CPC ................................ F21K 9/232; F21K 9/238
See application file for complete search history.

(56) References Cited

U.S. PATENT DOCUMENTS

2016/0043292 A1 2/2016 Wang et al.
2017/0012177 A1* 1/2017 Trottier ..................... F21K 9/00
(Continued)

FOREIGN PATENT DOCUMENTS

CN 104534302 A 4/2015
CN 205208156 U 5/2016
(Continued)

*Primary Examiner* — William N Harris

(57) ABSTRACT

The invention provides a light generating device (100) comprising (i) n filaments (200), (ii) an power distribution unit (400), and (iii) electronics (500); wherein: (a) each of the n filaments (200) comprises one or more solid state light sources (10), wherein n≥1, wherein each of the n filaments (200) comprises at least m electrical contacts (221), wherein m≥2; and wherein the n filaments (200) are configured to generate filament light (201); (b) the power distribution unit (400) comprises k electrically conductive tracks (410) separated by electrically insulating material (420), wherein k≥2; (c) at least two of the electrical contacts (221) of the n filaments (200) are functionally coupled to at least two different electrically conductive tracks (410); (d) the at least two different electrically conductive tracks (410) are functionally coupled to the electronics (500); and (e) the electronics (500) comprise one or more of a control system, a driver, and a transformer.

14 Claims, 11 Drawing Sheets

(I) (II) (III)

(51) Int. Cl.

| | |
|---|---|
| ***F21K 9/238*** | (2016.01) |
| ***F21V 23/00*** | (2015.01) |
| ***F21V 23/04*** | (2006.01) |
| ***F21Y 103/10*** | (2016.01) |
| ***F21Y 107/00*** | (2016.01) |
| ***F21Y 115/10*** | (2016.01) |

(52) U.S. Cl.

CPC ........ *F21V 23/0442* (2013.01); *F21V 23/045* (2013.01); *F21Y 2103/10* (2016.08); *F21Y 2107/00* (2016.08); *F21Y 2115/10* (2016.08)

(56) References Cited

U.S. PATENT DOCUMENTS

| | | | | |
|---|---|---|---|---|
| 2018/0106435 | A1* | 4/2018 | Wu | F21K 9/237 |
| 2018/0328543 | A1 | 11/2018 | Bergmann et al. | |
| 2019/0032858 | A1* | 1/2019 | Cao | F21K 9/238 |
| 2019/0086037 | A1 | 3/2019 | Cairns et al. | |
| 2020/0088355 | A1* | 3/2020 | Dutta | F21K 9/232 |
| 2020/0303356 | A1* | 9/2020 | Li | F21K 9/238 |
| 2021/0088189 | A1* | 3/2021 | You | H05B 45/20 |

FOREIGN PATENT DOCUMENTS

| | | | |
|---|---|---|---|
| CN | 110345400 | A | 10/2019 |
| CN | 210979385 | U | 7/2020 |
| EP | 3296614 | A1 | 3/2018 |
| EP | 3726935 | A1 | 10/2020 |

* cited by examiner

LED FILAMENT INTERCONNECTING RING

CROSS-REFERENCE TO PRIOR APPLICATIONS

This application is the U.S. National Phase application under 35 U.S.C. § 371 of International Application No. PCT/EP2021/087156, filed on Dec. 21, 2021, which claims the benefit of European Patent Application No. 21150271.1, filed on Jan. 5, 2021. These applications are hereby incorporated by reference herein.

FIELD OF THE INVENTION

The invention relates to a light generating device as well as to a retrofit lamp comprising such light generating device.

BACKGROUND OF THE INVENTION

LED filament lamps are known in the art. US2018/0328543, for instance, describes a lamp comprising an optically transmissive enclosure for emitting an emitted light; a base connected to the enclosure; at least one first LED filament and at least one second LED filament in the enclosure operable to emit light when energized through an electrical path from the base, the at least one first LED filament emitting light having a first correlated color temperature (CCT) and the at least one second LED filament emitting light having a second CCT that are combined to generate the emitted light; and a controller that changes the CCT of the emitted light when the lamp is dimmed. The optically transmissive enclosure is transparent.

SUMMARY OF THE INVENTION

Incandescent lamps are rapidly being replaced by LED based lighting solutions. It may nevertheless be appreciated and desired by users to have retrofit lamps which have the look of an incandescent bulb. For this purpose, one may make use of the infrastructure for producing incandescent lamps based on glass and replace the filament with LEDs emitting white light. One of the concepts is based on LED filaments placed in such a bulb. The appearances of these lamps are highly appreciated as they look highly decorative.

Multi-channel LED filaments require connection of multiple signals coming from a driver. Signals from the driver are normally transported via wires through a stem of the filament lamp. Connecting those wires to the filament contacts directly might be problematic especially when more than one filament is used in the bulb.

Hence, it is an aspect of the invention to provide an alternative light generating device, which preferably further at least partly obviates one or more of above-described drawbacks. The present invention may have as object to overcome or ameliorate at least one of the disadvantages of the prior art, or to provide a useful alternative.

Amongst others, the invention provides in embodiments an interconnection ring, but also other shaped units, which may distribute electrical power and/or distribute signals. Further, this may allow to connect the filament in a useful and proper way.

In a first aspect, the invention provides a light generating device comprising (i) n filaments and (ii) a power distribution unit. Further, the light generation device may comprise (iii) electronics. Especially, in embodiments each of the n filaments comprises one or more solid state light sources. Yet further, in specific embodiments n≥1. In embodiments, each of the n filaments comprises at least m electrical contacts. Yet further, in specific embodiments m≥2. Especially, the n filaments are configured to generate filament light. Further, in embodiments the power distribution unit may comprise k electrically conductive tracks separated by electrically insulating material. Further, especially in embodiments k≥2. Further, in specific embodiments at least two of the electrical contacts of the n filaments may be functionally coupled to at least two different electrically conductive tracks (of the power distribution unit). In yet further specific embodiments, the at least two different electrically conductive tracks may be functionally coupled to the electronics. Especially, in embodiments the electronics may comprise one or more of a control system, a driver, and a transformer. Hence, especially the invention provides in embodiments a light generating device comprising (i) n filaments, (ii) a power distribution unit, and (iii) electronics; wherein: (a) each of the n filaments comprises one or more solid state light sources, wherein n≥1, wherein each of the n filaments comprises at least m electrical contacts, wherein m≥2; and wherein the n filaments are configured to generate filament light; (b) the power distribution unit comprises k electrically conductive tracks separated by electrically insulating material, wherein k≥2; (c) at least two of the electrical contacts of the n filaments are functionally coupled to at least two different electrically conductive tracks; (d) the at least two different electrically conductive tracks are functionally coupled to the electronics; and (e) the electronics comprise one or more of a control system, a driver, and a transformer.

With the present invention, problems in relation to e.g. soldering the electrical wires directly into the glass stem for mechanical support and electrical insulation may be reduced or prevented. The present invention may further provide more space for creating electrical connection and may also provide a support for the filaments. The present invention may further allow an easier way of providing electrical power and/or signals to a plurality of filaments and control them individually, or control sets of filaments individually e.g. to control the color point and correlated color temperature (of the device light). The distribution of signals may be easier than in prior art solutions. Hence, amongst others the present invention may provide a useful solution for a multi-channel LED filaments lamp. Further, the invention may provide a solution for providing an alternative position of an RF antenna. Yet further, the filament may also assist in spreading heat from the filaments, and may thus assist in cooling.

As indicated above, the invention provides in embodiments a light generating device comprising (i) n filaments and (ii) a power distribution unit.

As indicated above, each of the n filaments comprise one or more solid state light sources. Each filament may comprise a support and a solid state light source, supported by the support. Especially, in embodiments each filament comprises a plurality of solid state light sources, though it is herein not excluded that an elongated solid state light source may be applied. Especially, the filament may comprise a (light transmissive) encapsulant which may at least partly enclose the solid state light source(s), especially at least enclose the light emitting surface(s) of the solid state light sources(s), such as the die(s).

The LED filament comprises a support, a set of solid state light sources ("light sources"), and an encapsulant. The LED filament may have a length axis having a first length (L1). Especially, the solid state light sources are arranged over the first length (L1) of the LED filament on the support. Further, the solid state light sources are configured to generate light source light (during operation of the light generating device). Especially, in embodiments the encapsulant encloses at least part of each of the solid state light sources of the set of solid state light sources. In general, the filaments may have aspect ratios of length and width, and of length and height, of at least 10, such as selected from the range of 10-10,000. The aspect ratios of different filaments may in specific embodiments differ, though in embodiments the aspect ratios may essentially be the same. Note that for a filament the aspect ratio of the length and width and the aspect ratio of the length and height may differ.

Further, in embodiments the encapsulant may comprise a luminescent material configured to convert at least part of the light source light into luminescent material light. Alternatively or additionally, one or more of the one or more solid state light sources may comprise a luminescent material, and the encapsulant may in embodiments be transparent or translucent.

Yet alternatively or additionally, the solid state light sources may be configured to generate solid state light source light without conversion material comprised by the solid state light source, i.e. the light of the solid state light source may have a spectral power distribution essentially the same as escaping from the die. Also in such embodiments, the (optional) encapsulant may in embodiments be transparent or translucent.

Hence, each of the n filaments may comprise one or more solid state light sources, especially a plurality of light sources, and each of the n filaments are configured to generate filament light (during an operational mode of the respective filament). The filament light may comprise one or more of luminescent material light and solid state light source light (of solid state light sources without luminescent material). The luminescent material light may be from PC solid state light sources, i.e. phosphor converter solid state light sources, or from luminescent material in the encapsulant. Solid state light sources without luminescent material may herein also be indicated as non-PC solid state light sources or direct color LEDs.

The filaments are not necessarily the same. For instance, there may be two or more filaments having different numbers of solid state light sources. Alternatively or additionally, there may be two or more filaments having different shapes. Alternatively or additionally, there may be two or more filaments configured to generate filament light having different spectral power distributions. Alternatively or additionally, there may be two or more filaments having different spectral power distribution turnabilities.

Further, there may be sets of filaments, wherein a set comprises two or more filaments which may be essentially identical, such as in number of solid state light sources and in filament light spectral power distribution, wherein the filaments within a set do (thus) essentially not mutually differ (in terms of spectral power distribution of the filament light), whereas filaments from different sets may mutually differ (especially in filament light spectral power distributions).

LED filaments of filament lamps may typically provide warm white light i.e. light of a very low color temperature. The color temperature is typically below 2700 K such as for example 2500 K or 2300 K. Some LED filaments lamps provide light of an ultra-low color temperature such as for example 2200 K or 2000 K. A low color temperature source will look yellowish or reddish, which is appreciated. Even lower CCT may be possible (see also below). However, higher CCT may also be possible (see also below).

As indicated above, the light generating device may comprise an LED filament, wherein the LED filament comprises a support, a set of solid state light sources, and an encapsulant. The number of light sources in the set may be at least 4, such as at least 8, even more especially at least 12, and may e.g. be up to 100, or yet even larger. Especially, in embodiments the number of light sources in the set may be selected from the range of 10-1000, such as 10-200.

The term "light source" may refer to a semiconductor light-emitting device, such as a light emitting diode (LEDs), a resonant cavity light emitting diode (RCLED), a vertical cavity laser diode (VCSELs), an edge emitting laser, etc. The term "light source" may also refer to an organic light-emitting diode, such as a passive-matrix (PMOLED) or an active-matrix (AMOLED). In a specific embodiment, the light source comprises a solid state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid state light source, such as a LED, or downstream of a plurality of solid state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

The term "parallel" may refer to substantially parallel or within +/−10 degrees, more preferably within +/−5 degrees of the axis of elongation.

The term electrically conductive tracks may refer to tracks which are electrically conductive and may be separated by electrically insulating material. Examples of electrically conductive tracks may be electrically conductive wires (e.g. comprising copper and/or silver), electrically conductive patterns e.g. made by lithography and/or (screen) printing kind of techniques. For example, electrically conductive tracks of copper may be used.

The phrases "different light sources" or "a plurality of different light sources", and similar phrases, may in embodiments refer to a plurality of solid state light sources selected from at least two different bins. Likewise, the phrases "identical light sources" or "a plurality of same light sources", and similar phrases, may in embodiments refer to a plurality of solid state light sources selected from the same bin.

Herein, in embodiments the solid state light sources within the set are especially essentially the same. Hence, they may e.g. be from the same bin. Therefore, in specific embodiments they may be configured to generate light source light having essentially the same color point and/or essentially the same dominant wavelength. In yet other embodiments, the solid state light sources comprise a limited number of different light sources, such as up to about 5, such as up to about 4, different types of solid state light sources, more especially up to about 3 different types of different solid state light sources. Therefore, in specific embodiments they may be configured to generate light source light having different color points and/or dominant wavelengths.

In specific embodiments, colors or color points of a first type of light and a second type of light may be different when the respective color points of the first type of light and the second type of light differ with at least 0.01 for u' and/or with least 0.01 for v', even more especially at least 0.02 for u' and/or with least 0.02 for v'. In yet more specific embodiments, the respective color points of first type of light and the second type of light may differ with at least 0.03 for u' and/or with least 0.03 for v'. In other specific embodiments, colors or color points of a first type of light and a second type of light may be essentially the same when the respective color points of the first type of light and the second type of light differ with at maximum 0.03 for u' and/or with least 0.03 for v', even more especially at maximum 0.02 for u' and/or with least 0.02 for v'. In yet more specific embodiments, the respective color points of first type of light and the second type of light may differ with at maximum 0.01 for u' and/or with least 0.01 for v'. Here, u' and v' are color coordinate of the light in the CIE 1976 UCS (uniform chromaticity scale) diagram.

As indicated above, in embodiments $n \geq 1$. Especially, however, $n \geq 2$. In many of the embodiments herein discussed, $2 \leq n \leq 8$, such as $2 \leq n \leq 6$. However, larger values for n are herein not excluded, such as e.g. in embodiments up to 12. For a single power distribution unit, values of n larger than about 6 may not be usual. However, it is also not excluded herein to use e.g. 2-3 power distribution units. The light generating device comprises at least one power distribution unit.

Especially, each of the n filaments comprises at least m electrical contacts, wherein $m \geq 2$. Especially, in embodiments m=2; however, m may also be larger. Each filament may comprise an anode and cathode. Especially, each filament has a cathode at one end of the filament and an anode at the other end of the filament. However, m may also be larger than 2 for a single filament. In embodiments, m may be 3 or 4 for a single filament. For instance, assuming a filament with two types of LED with different CCT, or assuming a filament with three colors, such as RGB, there may be a common anode or cathode, and 2, or 3, respectively, contacts for (high or low CCT, or R, G, and B, respectively) signals. Assuming a five channel filament, with e.g. R-G-B-WW-CW (with WW and CW indicated warm white and cool white, respectively), there may be 6 electrical contacts. Hence, in embodiments a filament may comprise a single cathode and a plurality of anodes, or a single anode and a plurality of cathodes.

Hence, in embodiments the number of electrical contacts may be the number of channels plus one. In embodiments of a R-G-B-WW-CW five channel, the number of contacts may thus be six. Further, the number of channels may also define the number of electrically conductive tracks. Especially, in embodiments the number of electrically conductive tracks at least equals the number of channels.

As indicated above, especially in embodiments each filament may comprise a plurality of solid state light sources. In specific embodiments, at least two of the plurality of solid state light sources of each filament are configured in series. It may also be possible that there are two or three arrays of each a plurality of solid state light sources in series, or even more arrays. In such embodiments, the filament may comprise more than two electrical contacts, e.g. dependent whether or not it may be desirable to e.g. control series of solid state light sources individually. For instance, assuming k11 series of solid state light sources, wherein $k11 \geq 1$, there may be k11+1 up to e.g. k11*2 contacts. When there would e.g. a mutual electrode (or "common electrode"), such as a common anode or a common cathode, then the number of contacts may e.g. be k11+1. As indicated above, when there is only one series, k11=1, and there may e.g. be two contacts. See further also below.

LED filaments as such are known, and are e.g. described in U.S. Pat. No. 8,400,051 B2, WO2020016058, WO2019197394, etc., which are herein incorporated by reference.

In embodiments, one or more filaments, especially all filaments, may have a substantial straight shape. In yet other embodiments, one or more filaments, especially all filaments, may have a curved shape. In yet other embodiments, one or more filaments, especially all filaments, may have a spiral shape. In yet other embodiments, one or more filaments, especially all filaments, may have a helical shape. When two or more filaments have spiral shapes or helical shapes, in embodiments two of these may have similarly configured windings. Other shaped filaments may also be possible, such as having the shape of characters, such as of letters, of numbers, of flowers, of leaves, or other shapes.

Especially, the invention provides a power distribution unit. The power distribution unit may also be indicated as "power and signal distribution unit". In embodiments the power distribution unit comprises k electrically conductive tracks ("tracks") separated by electrically insulating material. The power distribution unit may be seen as kind of multi-track system, wherein contacts of filaments are docketed to (in general only) one of the tracks. Especially, the power distribution unit may comprise at least two tracks. Hence, in embodiments $k \geq 2$. Specific embodiments of the power distribution unit are further described below.

In some embodiments, the number of k tracks may be equal to the number of filaments. Hence, each filament may be functionally coupled to a track. In yet other embodiments, sets of two or more filaments are functionally coupled to a track. In such embodiments, $k < n$. However, as further explained below, herein also embodiments are described wherein an electrically conductive trap may be used as antenna. In specific embodiments, k may be at least the number of individually controlled series of solid state light sources. Hence, in embodiments at least two of the electrical contacts of the n filaments may be functionally coupled to at least two different electrically conductive tracks. Especially, of each filament one of the electrical contacts is functionally coupled to one of the electrically conductive tracks.

Further, in embodiments the light generating device may further comprise electronics. In embodiments, the electronics comprise one or more of a control system, a driver, and a transformer. Hence, the electronics may provide the electrical power and/or signals for the respective filaments or sets of filaments. The power distribution unit may have a kind of intermediary function, wherein the power distribution unit is functionally coupled to the electronics and to the filaments(s). Or, in other words, the electronics may be functionally coupled to the filaments via the power distribution unit. Hence, especially, the at least two different electrically conductive tracks may be functionally coupled to the electronics. The electronics may be comprised by or supported by a PCB.

A functional coupling may e.g. be provided with methods known in the art, like soldering or welding. Optionally, (other) connectors may be applied, such as e.g. based on friction or crimping.

The power distribution unit may be (physically) configured between the filaments and the electronics. For instance, at least part of the electronics may be functionally coupled to a printed circuit board (PCB). The power distribution unit may be configured at a distance of at least about 1 mm from the PCB, such as at least about 2 mm. In embodiments, the power distribution unit may be configured parallel to the PCB. The PCB may in embodiments e.g. have a circular shape.

In specific embodiments the power distribution unit may have a ring-shape. Especially, the ring-shape may be a closed-ring shape, like a circle, a rectangle, a hexagon, an octagon, or other type of polygonal shape having nine or more sides. In other embodiments, the power distribution unit may have shape of a non-closed ring, like a kind of C-shape, or any of the afore-mentioned shapes not fully closing. Especially, in embodiments the power distribution unit has a ring-shape closing at least 270°, such as in embodiments 360° (full ring-shape). As the invention provides in embodiments ring-shaped power distribution units, the invention provides in specific embodiments a kind of interconnecting ring. When the ring is closed, in specific embodiments wherein the first supporting structure is applied, the ring may circumferentially surrounds the first supporting structure.

As indicated above, it is herein not excluded that the light generating device comprises more than one power distribution unit. In such embodiments, a first power distribution unit may be physically configured between a second power distribution unit and the electronics. When more than one power distribution unit is applied, the different power distribution unit may e.g. have different inner and outer diameters. Note however, that the present invention is not limited to ring-shaped power distribution units.

In embodiments, the power distribution unit may comprise one or more, especially two or more, electrically conductive tracks. Especially, the electrically conductive tracks may be configured parallel to each other. The power distribution unit may have a length or circumference that is larger than the length of the respective tracks. However, in other embodiments the length of the respective tracks may be in the range of 70-100% of the length or circumference of the power distribution unit. If each of the respective tracks has a length in the range of 70-100% of the length or circumference of the power distribution unit this may further allow an easier way of providing electrical power and/or signals to a plurality of filaments and control them individually, or control sets of filaments individually.

The power distribution unit may have a (maximum) height of about 0.5-20 mm, such as 1-10 mm, such as 1-5 mm. Further, the power distribution unit may have a (maximum) thickness of about 0.1-15 mm, like 0.2-10 mm. Yet further, power distribution unit may have an (minimum) inner diameter and a (maximum) outer diameter each of about 2-80 mm, wherein the outer diameter is larger than the inner diameter (with about the value of the thickness).

For instance, in embodiments the power distribution unit may have a cross-sectional shape of a triangle, with at the edges electrically conductive tracks, separated by electrically insulating material. This could e.g. provide three different electrically conductive tracks. For instance, in embodiments the power distribution unit may have a cross-sectional shape of a rectangle, with at the edges electrically conductive tracks, separated by electrically insulating material. This could e.g. provide four different electrically conductive tracks. For instance, in other embodiments the power distribution unit may have a cross-sectional shape of a hexagon, with at the edges electrically conductive tracks, separated by electrically insulating material. This could e.g. provide six different electrically conductive tracks. Other shapes, however, may also be possible.

In embodiments, the electrically insulating material comprises a polymeric material. Alternatively or additionally, the electrically insulating material comprises one or more of a glass material, a composite material, and a ceramic material. Other non-metal materials may also be applied as electrically insulating material. For instance, the electrically insulating material may be selected from the group consisting of, PET, PE, PC, PP, $Al_2O_3$, and glass, though other materials may also be applied, such as in embodiments flex foil.

For instance, in embodiments the power distribution unit may be provided by 2K molding of electrically conductive and electrically insulating material. In yet other embodiments, the power distribution unit may be provided by overmolding, using electrically conductive inserts and an electrically insulating (base) material. In yet other embodiments, the power distribution unit may be provided by printing electrically conductive tracks on a glass body or on a ceramic body. In yet other embodiments, the power distribution unit may be provided by depositing electrically conductive tracks on a support, such as polymeric body, a glass body, or a ceramic body. Especially, the electrically insulating material may be configured as support for the electrically conductive tracks. The electrically conductive tracks comprise electrically conductive material. The electrically conductive material may e.g. comprise one or more of copper and silver, especially copper.

An electrically conductive element such as an electrically conductive track and/or an electrical contact may comprise, or essentially consist of electrically conductive material. An electrically insulating element may comprise, or essentially consist of electrically insulating material. Herein, in embodiments a conductive material may especially comprise a conductivity (at room temperature) of at least $1 \cdot 10^5$ S/m, such as at least $1 \cdot 10^6$ S/m. Herein, a conductivity of an insulated material may especially be equal to or smaller than $1 \cdot 10^{-10}$ S/m, especially equal to or smaller than $1 \cdot 10^{-13}$ S/m. Herein a ratio of an electrical conductivity of an isolating material (insulator) and an electrical conductivity of an electrically conductive material (conductor) may especially be selected smaller than $1 \cdot 10^{-15}$. An electrically conductive contact may refer to a (physical) contact between two (or more) electrically conductive elements, such as two electrically conductive layers. When in such embodiments the electrical conductivity of the arrangement of the two conductive elements measured over the two conductive elements be at least $1 \cdot 10^6$ S/m, then there is electrically conductive contact. It may also refer in specific embodiments to an arrangement of two (or more) electrically conductive elements with a medium in between. When in such embodiments the electrical conductivity of the arrangement of the two conductive elements measured over the two conductive elements with the medium in between, be at least $1 \cdot 10^6$ S/m, then there is also electrically conductive contact. In specific embodiments, a resistivity of a dielectric layer may be at least about 1 MOhm*cm.

Especially, in embodiments the insulating material may either be reflective or light transmissive.

Filament lamps may also comprise a support for the filaments. Such support may have the shape of or look like a glass stem, like in classical light bulbs. Relative to a length of the light generating device, such support may be configured in embodiments parallel to the length of the light generating device. The above mentioned power distribution unit may e.g. be configured in embodiments perpendicular to such support.

This supporting structure is herein indicated as "first supporting structure". Hence, in embodiments the light generating device may further comprising a first supporting structure. Especially, the first supporting structure may be configured to support the n filaments. For instance, at one end the filaments may be functionally coupled to the first support structure. As indicated above, the power distribution unit may in embodiments also be configured as to support the filaments. Hence, in specific embodiments one or more of the power distribution unit and the first supporting structure are configured to support the n filaments. Even more especially, in embodiments both the power distribution unit and the first supporting structure may be configured to support the n filaments. For instance, at one end the filaments may be functionally coupled to the first support structure and at another, the filaments may be functionally coupled to the power distribution unit. Here, the term "support" may refer to e.g. keeping in place.

In specific embodiments, the first supporting structure may comprise a hollow glass body. In yet other embodiments, the first supporting structure may comprise a hollow ceramic body. In yet other embodiments, the first supporting structure may comprise a hollow quartz body. In yet other embodiments, the first supporting structure may comprise a hollow polymeric body. The first supporting structure may in yet other embodiments comprise a massive body. Materials other glass, ceramic, quartz, and polymeric may also be used. Especially, in embodiments the first supporting structure is transmissive for light, like transparent for light (of the filament(s)).

Especially, the first supporting structure as such may be electrically insulating, though the first supporting structure may in embodiments support one or more electrically conductive tracks.

Especially, in embodiments the first supporting structure may have a length equal to or larger than (the effective length of) the filaments.

The light generating device may in general comprise a light transmissive envelope ("bulb"), such as a light transparent envelope, such as in embodiments a glass envelope. The envelope may at least partly, even more especially substantially, enclose the one or more filaments. The light transmissive envelop may have an envelope height (e.g. defined by the standard shapes B35, A60, ST63, G90, etc.). The first supporting structure may have e length of at least 20% of the height light transmissive envelope, such as in embodiments up to about 80%. Especially, the envelope is transparent for (visible) light.

In specific embodiments, the power distribution unit at least partly circumferentially surrounds the first supporting structure. As indicated above, the above mentioned power distribution unit may e.g. be configured in embodiments perpendicular to such support.

In embodiments, the PCB may also be functionally coupled to the first supporting structure.

The first supporting structure may also be configured to host or support electrical conductors. For instance, an electrical circuit may be provided form the PCB via the power distribution unit to the filaments and via the electrical conductors hosted or supported by the first supporting structure back to the PCB.

The electrical conductors may comprise one or more of electrical wires and electrical conductive tracks. For instance, in embodiments the electrical conductors may comprise lead throughs which may be hosted by the first supporting element.

Herein, the term "hosting" may especially refer to a hollow first supporting element, through which e.g. one or more electrical conductors may be configured.

As can be derived from the above, in embodiments $n \geq 2$. Further, especially the electrical contacts comprise first electrical contacts and second electrical contacts, wherein the first electrical contacts of the filaments are (in embodiments) functionally coupled to different electrically conductive tracks, and wherein the second electrical contacts of the filaments are functionally coupled the electronics. The latter functional coupling may be provided in different ways.

In embodiments, the functional coupling between the second electrical contacts of the filaments and the electronics may be provided via multiple electrical conductors hosted or supported by the first supporting structure (see also above).

Alternatively, the second electrical contacts of the filaments may be functionally coupled to the same electrically conductive track, but different from the different electrically conductive tracks to which the first electrical contacts are functionally coupled. In this way, there may be a mutual electrode to which the second electrical contacts may be functionally coupled.

Alternatively, such mutual electrode may be hosted or supported by the first supporting element. Hence, in specific embodiments the second electrical contacts of the filaments may be functionally coupled to a mutual electrode external from the power distribution unit, such as an electrical conductor hosted or supported by the first supporting elements.

Hence, in embodiments, wherein especially $n \geq 2$, the electrical contacts comprise first electrical contacts and second electrical contacts, wherein the first electrical contacts of the filaments are functionally coupled to different electrically conductive tracks, and wherein the second electrical contacts of the filaments are functionally coupled to (a) the same electrically conductive track, but different from the different electrically conductive tracks to which the first electrical contacts are functionally coupled, or (b) a mutual electrode external from the power distribution unit. Especially, in embodiments the mutual electrode may be functionally coupled with the electronics via an electrically conductive connection within the first supporting structure. The term "electrically conductive connection" may refer to an electrical conductor, such as an electrical wire or electrically conductive track.

Especially, in embodiments there are at least two electrically conductive tracks and at least two filaments, wherein at least two of the filaments are functionally coupled to different electrically conductive tracks, respectively. Further, the at least two filaments may be functionally coupled to the electronics via one or more electrically conductive connections hosted or supported by the first supporting structure. In this way, at least two of the filaments may be individually controlled. This may e.g. allow color tuning or correlated color temperature tuning (see also below). Hence, in embodiments k≥2 and n≥2; and the electronics may especially be configured to individually control at least two sets of each at least one filament.

Further, as indicated above, especially each of the filaments may comprise a plurality of solid state light sources.

In specific embodiments, at least two of the electrically conductive tracks are configured as anodes. Such embodiments may e.g. be combined with a mutual cathode for the filaments. As indicated above, the mutual cathode may e.g. be hosted or supported by the first supporting element.

When there are at least two filaments functionally connected to the power distribution unit, they may be functionally connected to different electrically conductive tracks. The electrically conductive tracks may especially have different positions relative to a device axis of the light generating device. This may imply that the at least two filaments may have (slightly) different angles relative the device axis of the light generating device. Hence, in embodiments the light generating device has a first axis of elongation (or length axis or device axis) and the n filaments have each individually a second axis of elongation (or length axis), wherein at least two second axes of elongation (A2) have different second angles β relative to the first axis of elongation (A1).

When there are at least two filaments functionally connected to the power distribution unit, they may equally divide a space. For instance, when there are two filaments, these may be configured opposite to each other relative to a device axis. For instance, when there are three filaments, these may be configured in a triangular pattern, with equal mutual angles, etc.

Hence, in specific embodiments axes of elongations of the respective filaments may be configured in planes intersecting at a device axis, and wherein the planes have mutual first angles α selected from the range of 15-180°. For instance, with n filaments, the mutual first angles may in embodiments be 360°/n. However, the filaments are not necessarily evenly distributed.

Hence, in specific embodiments the n filaments may comprise a first filament and a second filament, wherein the first filament is mechanically and electrically connected to a first electrically conductive track of the at least two different electrically conductive tracks; wherein the second filament is mechanically and electrically connected to the second electrically conductive track of the at least two different electrically conductive tracks; wherein axes of elongations of the respective filaments are configured in planes intersecting at a device axis, and wherein the planes have mutual first angles α selected from the range of 15-180°, and wherein the light generating device has a first axis of elongation (A1) and the n filaments have each individually a second axis of elongation (A2), wherein at least two second axes of elongation (A2) have different second angles β relative to the first axis of elongation (A1).

In specific embodiments, 3≤k≤6 and n≥3. In yet further specific embodiments, 3≤k≤6 and 3≤n≤6, and n=k. However, in other embodiments 3≤k≤6 and n=2*k, or 3*k.

When there are a plurality of (sets of) light sources, it may in embodiments be possible to control the spectral power distribution of the device light. The device light may essentially consist of the filament light of one or more of the n filaments (when in operation).

As indicated above, a filament may comprise two or more arrays of light sources, which arrays may individually controlled. Alternatively or additionally, two or more filaments may be alternatively controlled.

Hence, in embodiments one or more of the color point and correlated color temperature of the device light may in embodiments be controllable. Especially, the device light essentially consists of the filament light.

For instance, the device light may have a controllable color points, with two or more color points (in different operational modes) having color point differences of at least 0.03 for u' and/or with least 0.03 for v'. Alternatively or additionally, device light may have a controllable color point, with two or more spectral power distributions (in different operational modes) having different centroid wavelengths mutually differing at least 10 nm. In specific embodiments, at least two spectral power distributions of the device light (in at least two respective operational modes) may have centroid wavelengths differing least 10 nm, such as at least 20 nm, or even at least 30 nm, such as a difference selected from the range of 30-200 nm.

The term "centroid wavelength", also indicated as λc, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c=\Sigma\lambda*I(\lambda)/(\Sigma I(\lambda)$, where the summation is over the wavelength range of interest, and I(λ) is the spectral energy density (i.e. the integration of the product of the wavelength and the intensity over the emission band normalized to the integrated intensity). The centroid wavelength may e.g. be determined at operation conditions.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a “mode” or “operation mode” or “mode of operation”. Likewise, in a method an action or stage, or step may be executed in a “mode” or “operation mode” or “mode of operation” or “operational mode”. The term “mode” may also be indicated as “controlling mode”. This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. “on”, without further tunability).

Hence, in embodiments, the control system may control in dependence of one or more of an input signal of a user interface, a sensor signal (of a sensor), and a timer. The term “timer” may refer to a clock and/or a predetermined time scheme.

Especially, in embodiments at least two sets of solid state light sources may be configured to generate (solid state light source) light having different spectral power distributions. For instance, in embodiments the at least two sets may be configured to provide (solid state light source) light having (i) different correlated color temperatures with differences of at least 500 K, or (ii) different colors with color point differences of at least 0.03 for u' and/or at least 0.03 for v'. Especially, the electronics may be configured to control the at least two sets of solid state light sources, such as in embodiments in dependence of one or more of an input signal of a user interface, a sensor signal, and a timer. For instance, two or more sets may be configured to generate (solid state light source) light having different colors selected from violet, cyan, blue, green, yellow, orange, red, or optionally other colors.

Yet, in specific embodiments at least two of the n filaments may be configured to generate filament light having different spectral power distributions. For instance, in embodiments the at least two of the n filaments may be configured to generate filament light having (i) different correlated color temperatures with differences of at least 500 K, or (ii) different colors with color point differences of at least 0.03 for u' and/or at least 0.03 for v'. Especially, the electronics may be configured to control the at least two of the n filaments, such as in embodiments in dependence of one or more of an input signal of a user interface, a sensor signal, and a timer. For instance, two or more filaments may be configured to generate filament light having different colors selected from violet, cyan, blue, green, yellow, orange, red, or optionally other colors.

In embodiments, the at least two different types of light may comprise at least two spectral power distributions of white light, but differing in correlated color temperature, such as at least 500 K.

Especially, in embodiments one of the types of light has a spectral power distribution with a correlated color temperature selected from the range of 1800-2700 K, such as selected the range of 1900-2400 K. However, other ranges may also be possible, such as e.g. in the range of 1800-6500 K. Especially, when the CCT value of the device light is variable, the largest difference in CCT is at least 500 K.

The term “white light” herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms “visible”, “visible light” or “visible emission” and similar terms refer to light having one or more wavelengths in the range of about 380-780 nm. Herein, UV may especially refer to a wavelength selected from the range of 200-380 nm.

The terms “light” and “radiation” are herein interchangeably used, unless clear from the context that the term “light” only refers to visible light. The terms “light” and “radiation” may thus refer to UV radiation, visible light, and IR radiation. In specific embodiments, especially for lighting applications, the terms “light” and “radiation” refer to (at least) visible light.

The terms “violet light” or “violet emission” especially relates to light having a wavelength in the range of about 380-440 nm. The terms “blue light” or “blue emission” especially relate to light having a wavelength in the range of about 440-490 nm (including some violet and cyan hues). The terms “green light” or “green emission” especially relate to light having a wavelength in the range of about 490-560 nm. The terms “yellow light” or “yellow emission” especially relate to light having a wavelength in the range of about 560-590 nm. The terms “orange light” or “orange emission” especially relate to light having a wavelength in the range of about 590-620. The terms “red light” or “red emission” especially relate to light having a wavelength in the range of about 620-750 nm. The term “cyan” may refer to one or more wavelengths selected from the range of about 490-520 nm. The term “amber” may refer to one or more wavelengths selected from the range of about 585-605 nm, such as about 590-600 nm.

As indicated above, one (or more) of the electrically conductive tracks may be configured as antenna. Such electrically conductive track is not functionally coupled to one of the filaments, but may be functionally coupled to the electronics, especially a WiFi-based radio device, a Zigbee-based device, or a Bluetooth-based device. Especially, an antenna may be available when there are also at least two tracks available that are functionally coupled to one or more filaments. Hence, in specific embodiments $k \geq 3$, and at least one of the electrically conductive tracks is configured as antenna.

In a specific embodiments, two tracks may be configured as cathode and anode, respectively, for the same filament(s).

Hence, in embodiments, wherein k is at least 2, such as wherein k=2, one of the electrically conductive tracks may be configured as anode, and one of the electrically conductive tracks may be configured as cathode.

In yet a further aspect, the invention also provides a light generating device as defined herein, wherein the light generating device is a retrofit lamp. In yet a further aspect, the invention also provides a lamp or a luminaire comprising the light generating device as defined herein. The luminaire may further comprise a housing, optical elements, louvres, etc. etc. . . . The lamp or luminaire may further comprise a housing enclosing the light generating device. The lamp or luminaire may comprise a light window in the housing or a housing opening, through which the system light may escape from the housing.

In an embodiment, the power distribution unit does not comprise a (solid state) light source.

In an embodiment, the n filaments are n LED filaments.

In an embodiment, in a cross-sectional view the power distribution unit comprises k electrically conductive tracks separated by electrically insulating material, wherein $k \geq 2$ or $k \geq 2$ or even $k \geq 4$. Preferably, k electrically conductive tracks may be arranged at different sites of the power distribution unit and/or may be equally distributed around the periphery of the power distribution unit.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
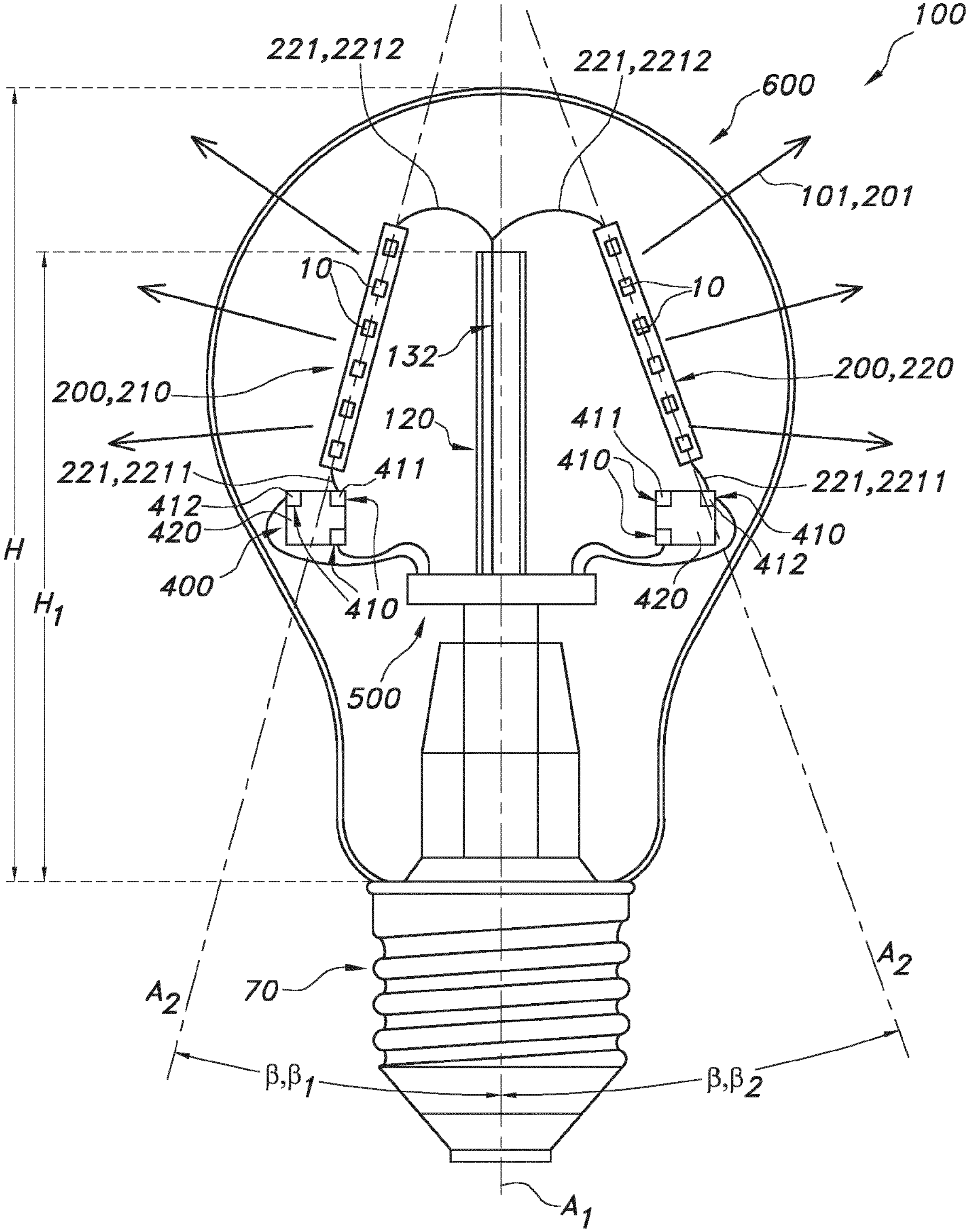
FIGS. 1*a*-1*b* schematically depict an embodiment and some aspects.

FIG. 1*a* schematically depicts an embodiment of a light generating device 100 comprising n filaments 200, a power distribution unit 400, and electronics 500. FIG. 1*a* schematically depicts a cross-sectional shape. Each of the n filaments 200 comprises one or more solid state light sources 10. Especially, $n \geq 1$. Here, n=2. Each of then filaments 200 comprises at least m electrical contacts 221. Especially, $m \geq 2$. Here, m=2. The n filaments 200 are configured to generate filament light 201 (during operation).

The power distribution unit 400 comprises k electrically conductive tracks 410 (see amongst others FIG. 1*b*) separated by electrically insulating material 420. For the embodiment of FIG. 1*a*, for instance $k \geq 2$. For the sake of understanding, different electrically conductive tracks 410 are indicated with references 411 and 412, respectively.

At least two of the electrical contacts 221 of the n filaments 200 may be functionally coupled to at least two different electrically conductive tracks. The at least two different electrically conductive tracks may be functionally coupled to the electronics 500.

Especially, the electronics 500 may comprise one or more of a control system, a driver, and a transformer.

Reference 600 refers to a light transmissive envelope. Reference 170 indicates a screw cap or Edison (screw) cap. In embodiments, the power distribution unit 400 has a ring-shape. Reference H indicates the height of the light transmissive envelope 600.

The light generating device 100 may further comprise a first supporting structure 120. One or more of the power distribution unit 400 and the first supporting structure 120 may be configured to support the n filaments 200. The power distribution unit 400 at least partly circumferentially surrounds the first supporting structure 120. In embodiments, the first supporting structure 120 may comprise a hollow glass body. Reference H1 indicates the height of the first supporting structure 120.

As indicated above, in embodiments $n \geq 2$. In embodiments, $k \geq 2$ and $n \geq 2$.

In embodiments, the electrical contacts 221 comprise first electrical contacts 2211 and second electrical contacts 2212. The first electrical contacts 2211 of the filaments 200 may be functionally coupled to different electrically conductive tracks. The second electrical contacts 2212 of the filaments 200 may be (i) functionally coupled to a the same electrically conductive track, but different from the different electrically conductive tracks 410 to which the first electrical contacts 2211 are functionally coupled, or (ii) may be functionally coupled to a mutual electrode 132 external from the power distribution unit 400.

In embodiments, each filament 200 may comprise a plurality of solid state light sources 10.

The mutual electrode 132 may be functionally coupled with the electronics 500 via an electrically conductive connection within the supporting structure.

In embodiments, the electronics 500 may be configured to individually control at least two sets of each at least one filament 200. Especially, each of the filaments 200 comprises a plurality of solid state light sources 10.

The light generating device 100 has a first axis of elongation A1 and the n filaments 200 have each individually a second axis of elongation A2, wherein at least two second axes of elongation A2 have different second angles β relative to the first axis of elongation A1. The respective second angles β, for the respective filaments 200, are indicated with references β1 and β2. Note that they may slightly differ in the schematically depicted embodiment.

Figure 1B:
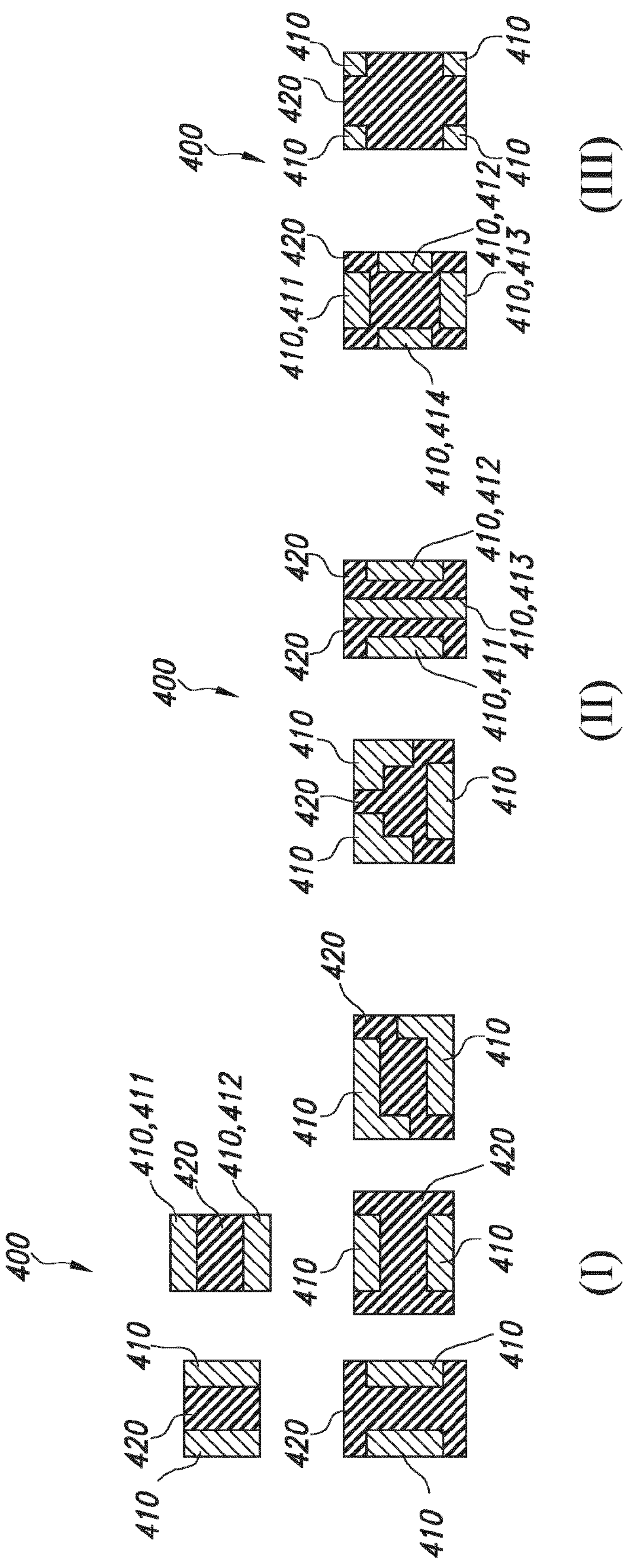

FIG. 1*b* schematically depict cross-section of possible power distribution units 400. The embodiments at I show two electrically conductive tracks 410 and electrically insulating material 420. The embodiments at II show three electrically conductive tracks 410 and electrically insulating material 420. The embodiments at III show four electrically conductive tracks 410 and electrically insulating material 420. Other embodiments, however, may also be possible. Different electrically conductive tracks 410 are indicated with references 411, 412, 413, 414, respectively. In embodiments, the electrically insulating material 420 may comprise a polymeric material. In embodiments, the electrically insulating material 420 comprise one or more of a glass material, a composite material, and a ceramic material. Especially, in embodiments, at least two of the electrically conductive tracks 410 are configured as anodes. In embodiments, at least one of the electrically conductive tracks 410 is configured as antenna. Especially this may apply in embodiments, wherein $k \geq 3$.

Referring to FIGS. 1*a*-1*b* (and also e.g. some embodiments depicted in FIGS. 2*a*-2*f*), the n filaments 200 may comprise a first filament 210 and a second filament 220. The first filament 210 is mechanically and electrically connected to a first electrically conductive track 411 of the at least two different electrically conductive tracks 410. The second filament 220 is mechanically and electrically connected to the second electrically conductive track 412 of the at least two different electrically conductive tracks 410.

In embodiments, at least two of the n filaments 200 are configured to generate filament light 201 having different spectral power distributions.

In embodiments, the at least two of the n filaments 200 are configured to generate filament light 201 having i different correlated color temperatures with differences of at least 500 K, or ii different colors with color point differences of at least 0.03 for u' and/or at least 0.03 for v'.

In embodiments, the electronics 500 may be configured to control the at least two of the n filaments 200 in dependence of one or more of an input signal of a user interface, a sensor signal, and a timer.

In specific embodiments 3≤k≤6 and n≥3. Further, in specific embodiments k=2, and one of the electrically conductive tracks 410 is configured as anode, and one of the electrically conductive tracks 410 is configured as cathode.

Figure 2A:
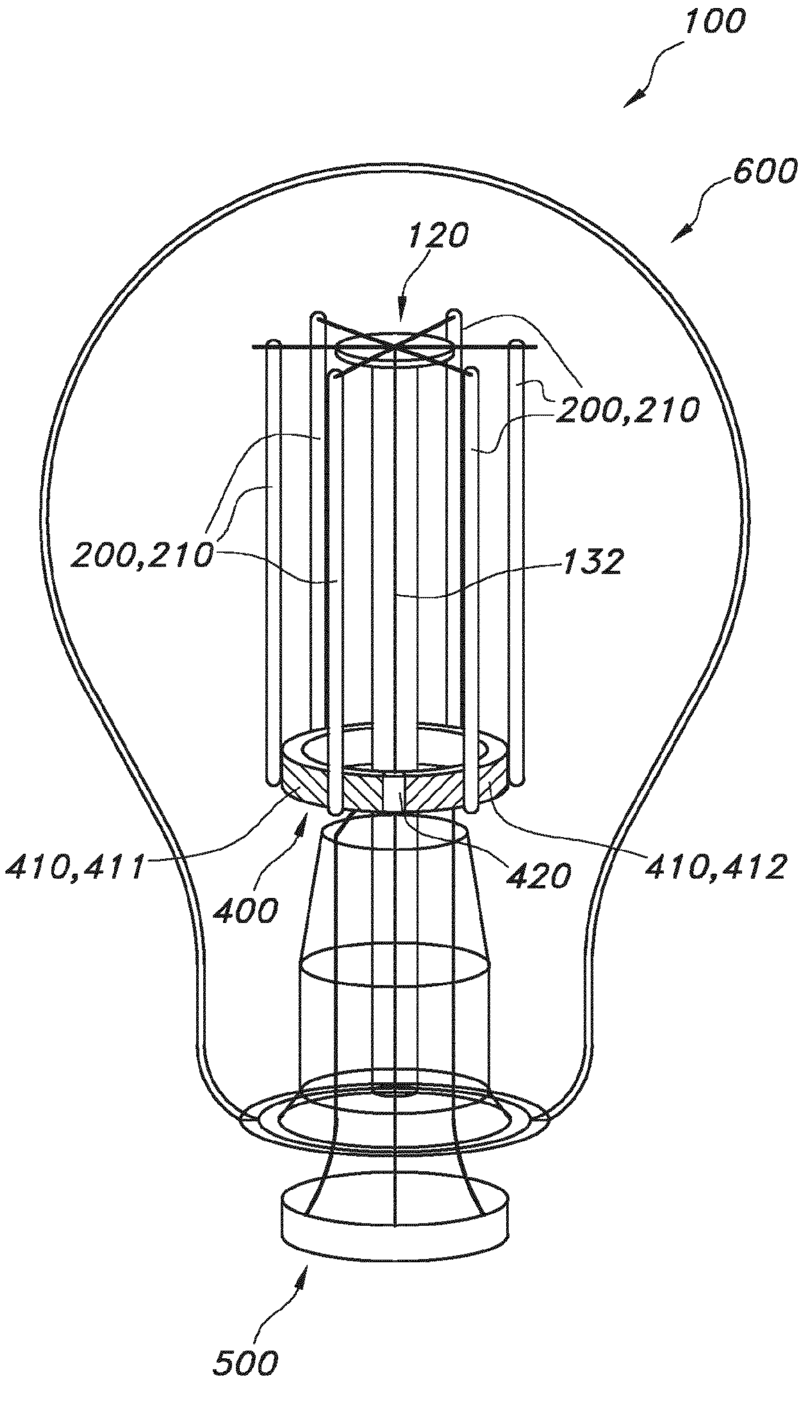
FIGS. 2*a*-2*f* schematically depict some embodiments.

Referring to FIG. 2*a*, n=6 and k=2. Note that there are two sets of each three filaments 200. The filaments have at one side a mutual electrode, which, via the first supporting structure 120, may be connected to electronics (not shown).

Figure 2B:
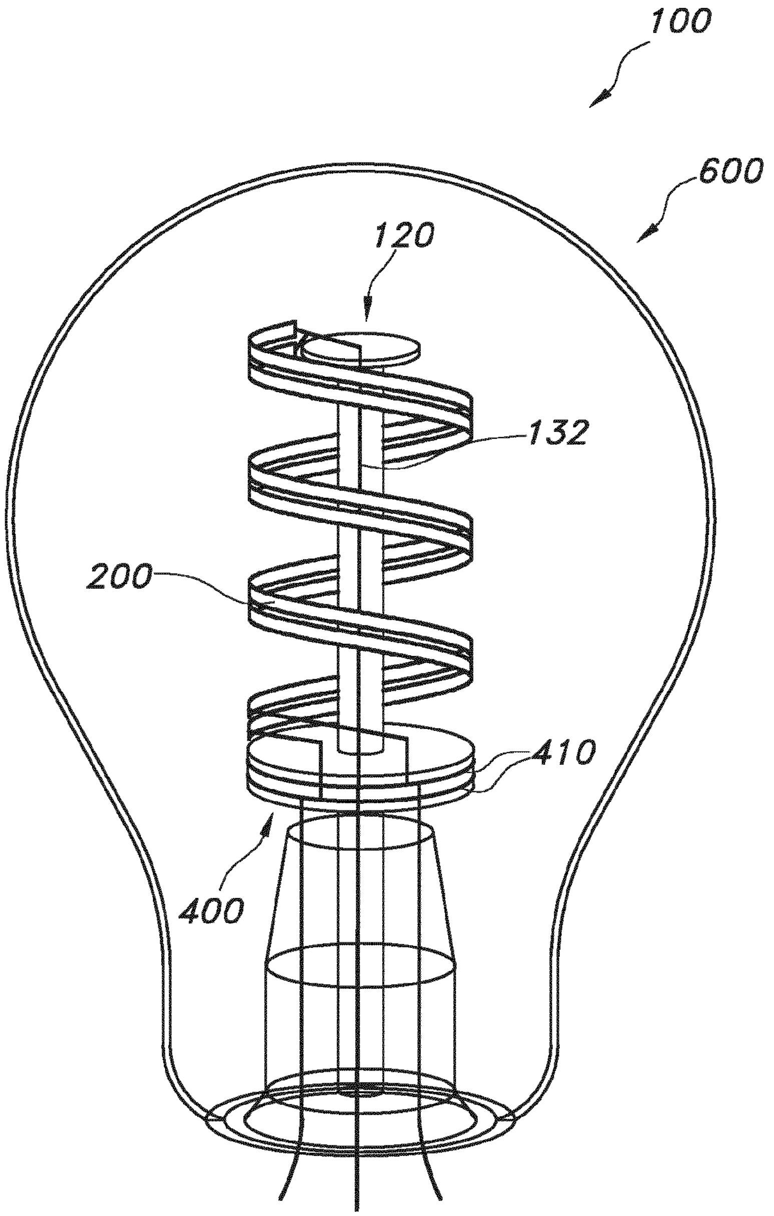

FIG. 2*b* schematically depicts an embodiments of a helically shaped filament 200. This filament 200 comprises two series of solid state light source. Hence, in this embodiment the power distribution unit 400 may have two electrically conductive tracks 410.

Figure 2C:
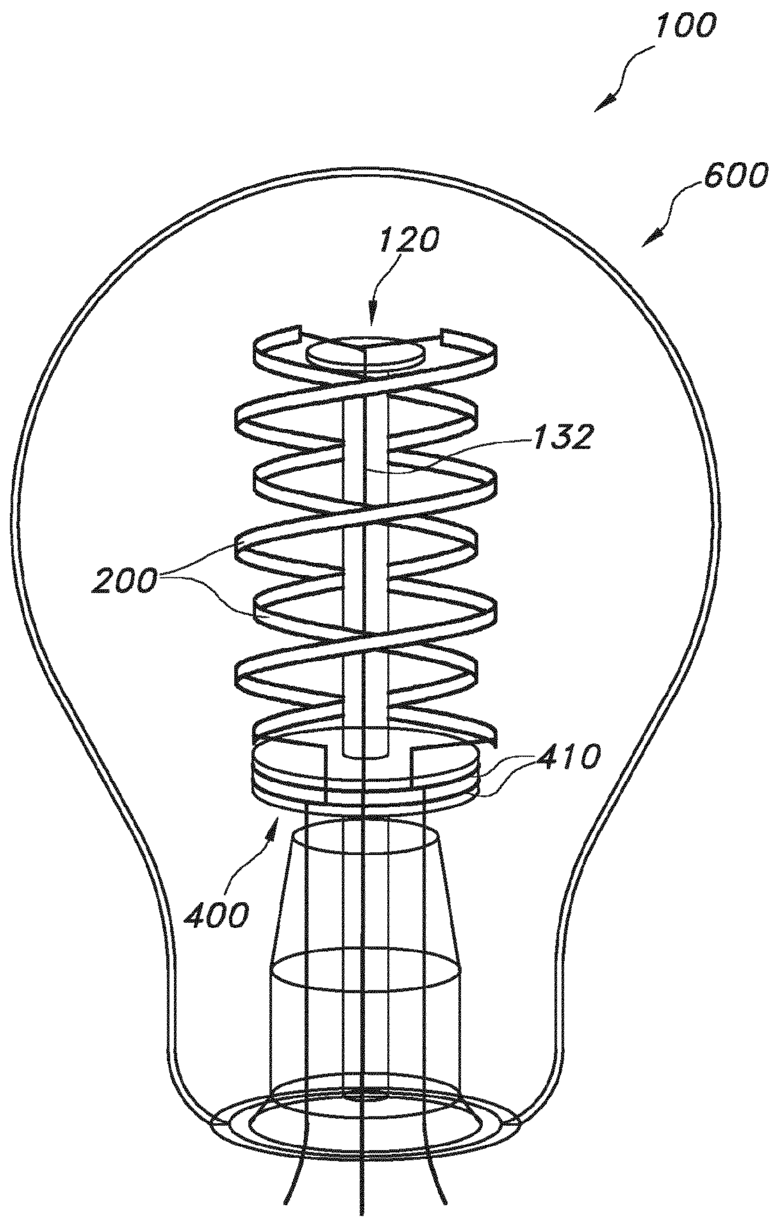

FIG. 2*c* schematically depicts an embodiment of two double helically shaped filaments 200. These filaments 200 each comprise a single series of solid state light source. Hence, also in this embodiment the power distribution unit 400 may have two electrically conductive tracks 410.

Figure 2D:
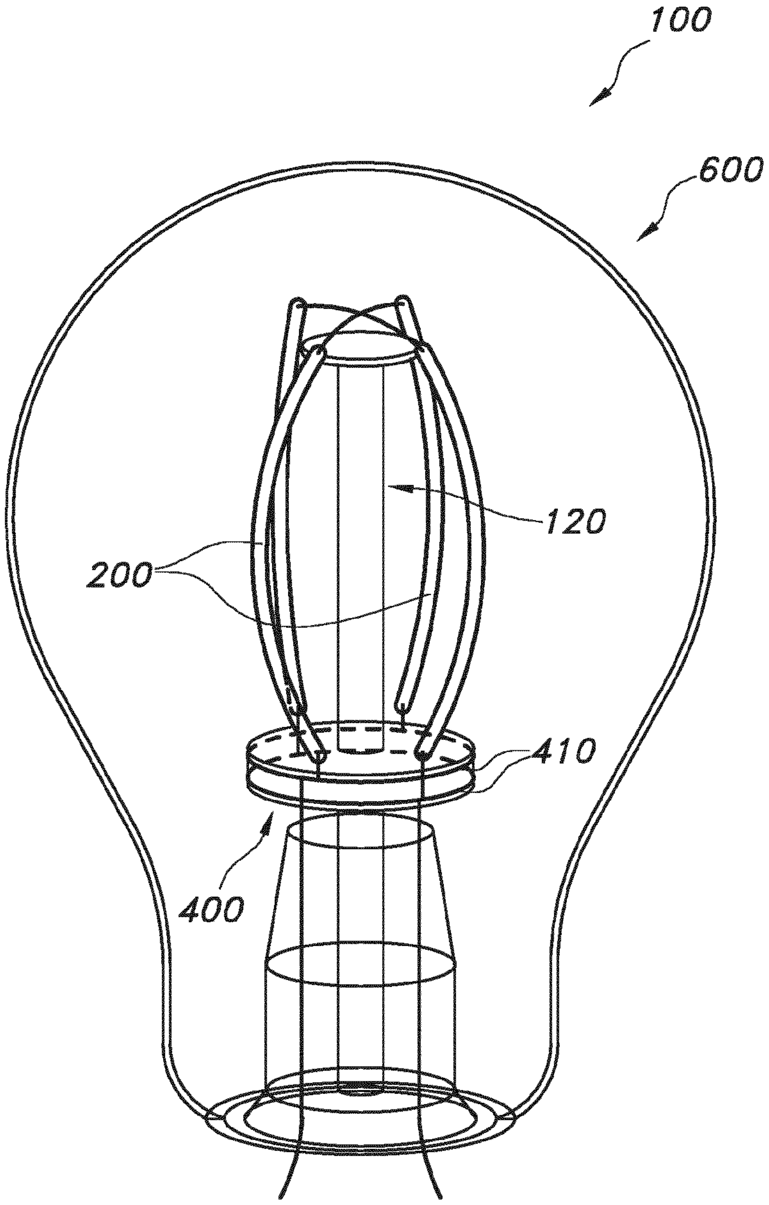

FIG. 2*d* schematically depicts an embodiment of two sets of each two (curved) filaments 200. These filaments 200 each comprise a single series of solid state light source. Hence, also in this embodiment the power distribution unit 400 may have two electrically conductive tracks 410. The filaments 200 within a set are functionally coupled the same electrically conductive track 410.

Figure 2E:
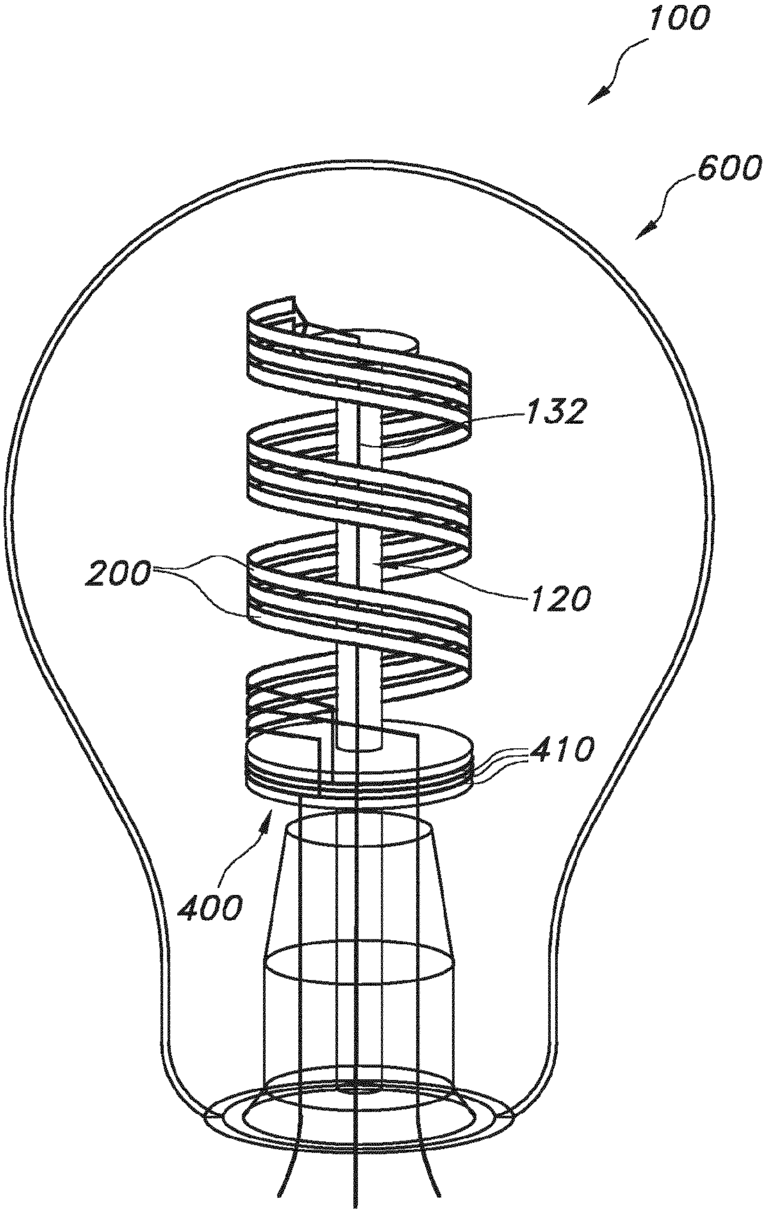

FIG. 2*e* schematically depicts an embodiments of a helically shaped filament 200. This filament 200 comprises three series of solid state light source. Hence, in this embodiment the power distribution unit 400 may have three electrically conductive tracks 410.

Figure 2F:
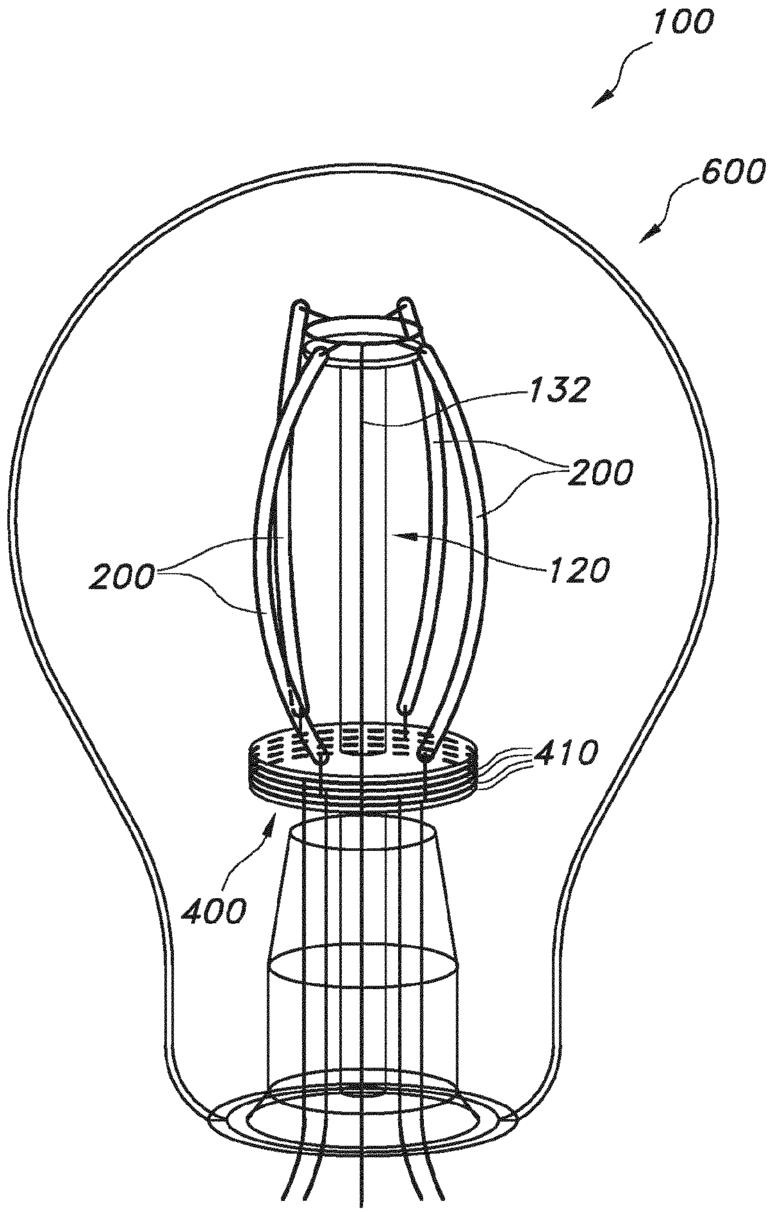

FIG. 2*f* schematically depicts an embodiment of four (curved) filaments 200. These filaments 200 each comprise a single series of solid state light source. Hence, in this embodiment the power distribution unit 400 may have four electrically conductive tracks 410.

FIGS. 3*a*-3*f* schematically depict some aspects.

Figure 3A:
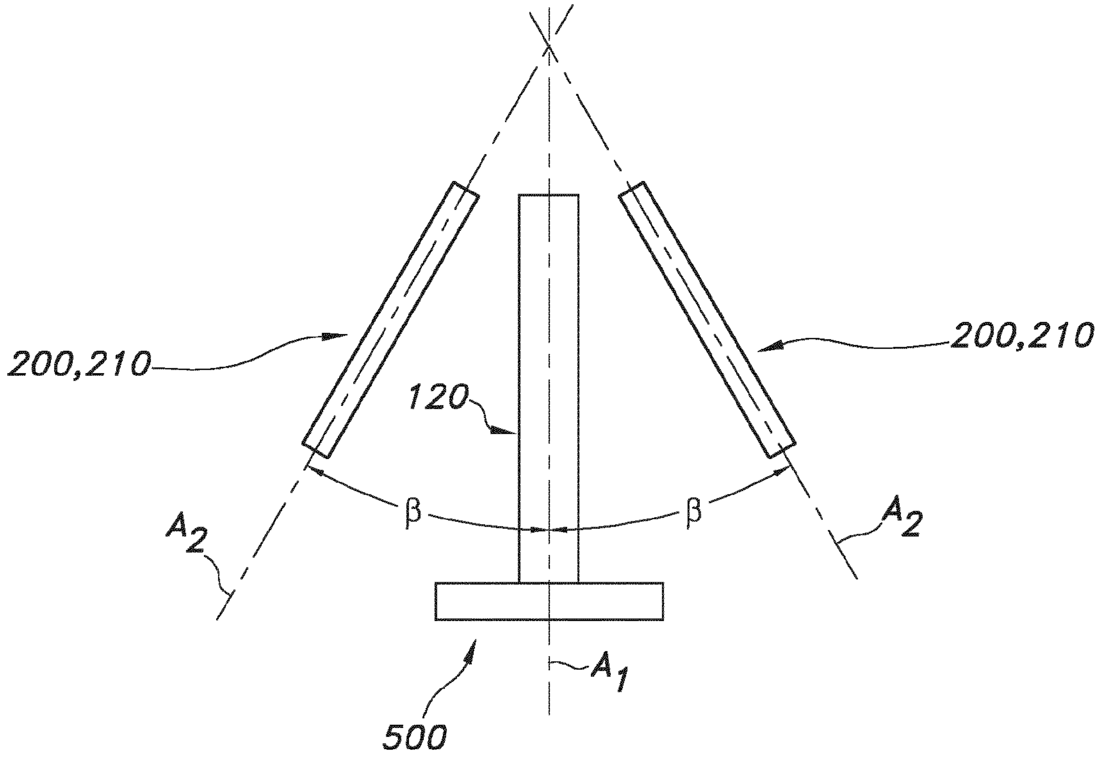
FIGS. 3*a*-3*e* schematically depict some embodiments and variants.

FIG. 3*a* is a cross-sectional view, schematically showing that there may be slightly different angles β of the filaments 200 with the device axis A1. Here, the values for the two angles β may thus differ.

Figure 3B:
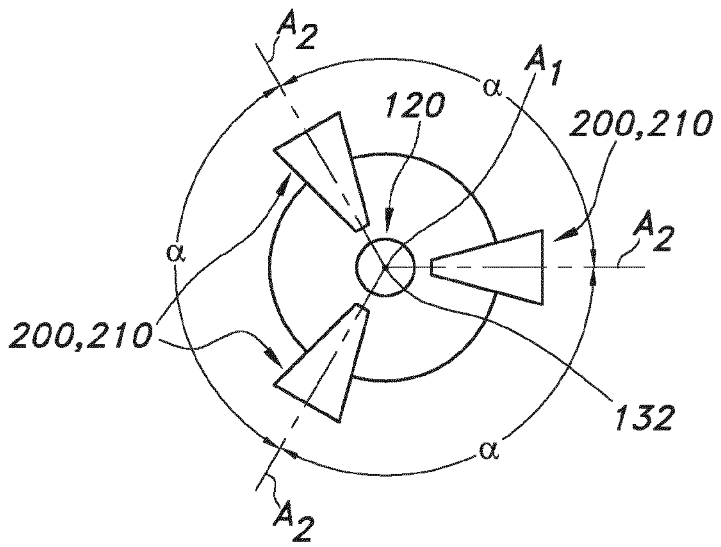

Referring to FIG. 3*b*, an embodiment is shown wherein axes of elongation A2 of the respective filaments 200 are configured in planes intersecting at a device axis A1. The planes have mutual first angles α selected from the range of 15-180°. FIG. 3*b* is a top view of an embodiment.

Figure 3C:
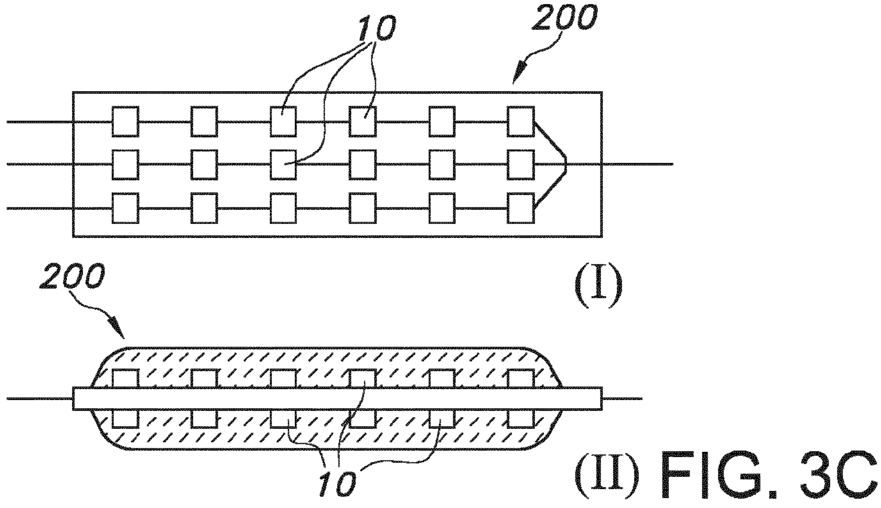

FIG. 3*c* schematically depicts two embodiments of each a single filament, but with three (in embodiment I), or two (in embodiments II) series of solid state light sources 10. In embodiments, these series may individually controlled. In embodiments I, k11=3, and in embodiment II, k11=2.

Figure 3D:
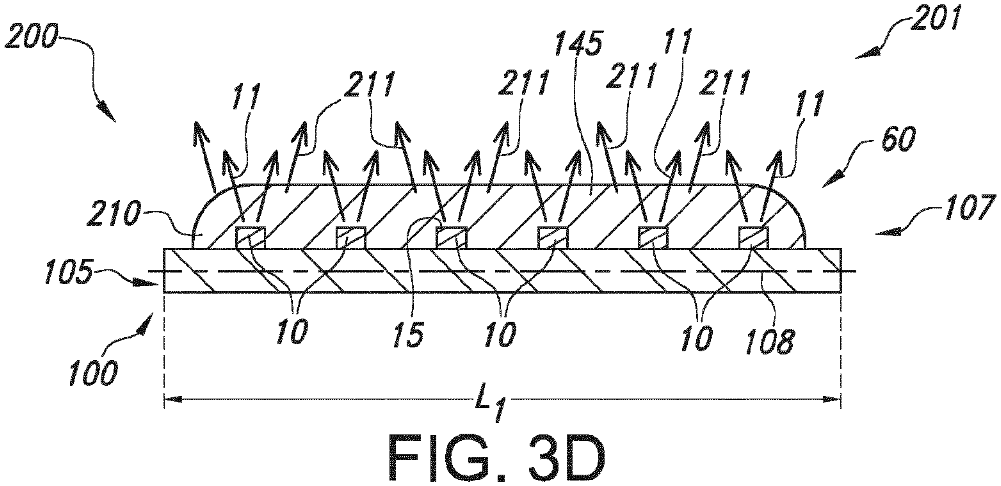

FIG. 3*d* schematically depicts an embodiment of a LED filament 200. The LED filament 200 comprises a support 105, a set 107 of solid state light sources 10, and an encapsulant 60. The LED filament 200 has a length axis 108 having a first length L1. The solid state light sources 10 are arranged over the first length L1 of the LED filament 200 on the support 105. The solid state light sources 10 are configured to generate light source light 11. In embodiments, the solid state light sources 10 may be configured to generate blue light source light 11. The encapsulant 60 encloses at least part of each of the solid state light sources 10 of the set 107 of solid state light sources 10. The encapsulant 60 comprises a luminescent material 210 configured to convert at least part of the light source light 11 into luminescent material light 211. In embodiments, the luminescent material 210 may be configured to convert at least part of the light source light 11 into luminescent material light 211 having wavelengths in one or more of (i) the green and/or red, and (ii) yellow and optionally red, especially in combination with blue light source light 11. Hence, the luminescent material may be configured to generate yellow light and/or red light due to conversion of at least part of the blue light. The luminescent material may also be configured to generate green light and/or red light due to conversion of at least part of the blue light. As indicated above, the term "luminescent material" may also refer to a plurality of different luminescent materials. Especially, the luminescent material may comprise a garnet luminescent material as described above. Reference 15 refers to a light emitting surface of the solid state light source 10, such as a LED die. The solid state light sources 10 may be available on a substrate or support 105. Further, the solid state light sources 10 (and the substrate 105) may especially be embedded in a light transmissive material, such as a resin. The light transmissive material enclosing the light sources is indicated with reference 145. Especially, the light transmissive material may comprise, such as embed, a luminescent material 210. Especially, this light transmissive material 145 may be a resin hosting luminescent material 210, such as an inorganic luminescent material in an organic resin. The resin may e.g. an acrylate or a silicone resin or an epoxy resin, etc. The combination of light transmissive material 145 and luminescent material is herein indicated as encapsulant 60.

The embodiment schematically depicts a cross-sectional view of a plane of drawing also comprising the length axis 108.

For curved filaments, the length L1 may be longer than the effective length, which may be defined e.g. as the length between two opposite ends of the filament.

Figure 3E:
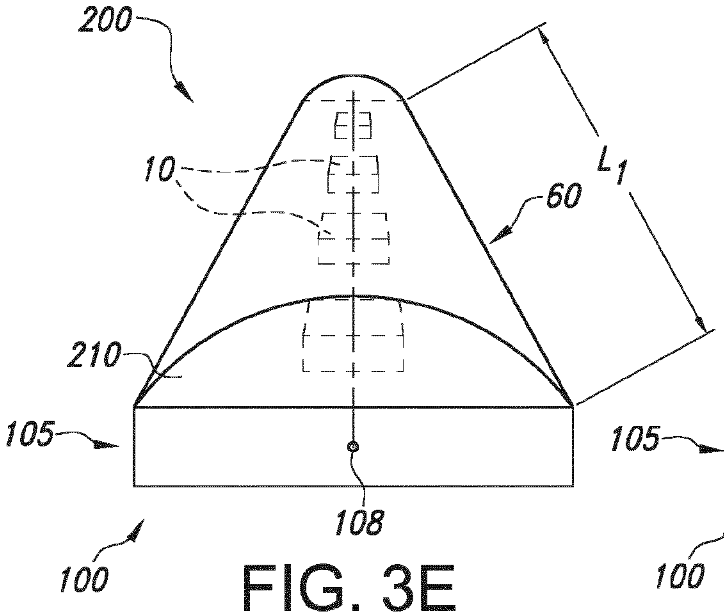

FIG. 3*e*-schematically depicts a perspective view of the same embodiment as schematically depicted in FIG. 3*d*.

Figure 3F:
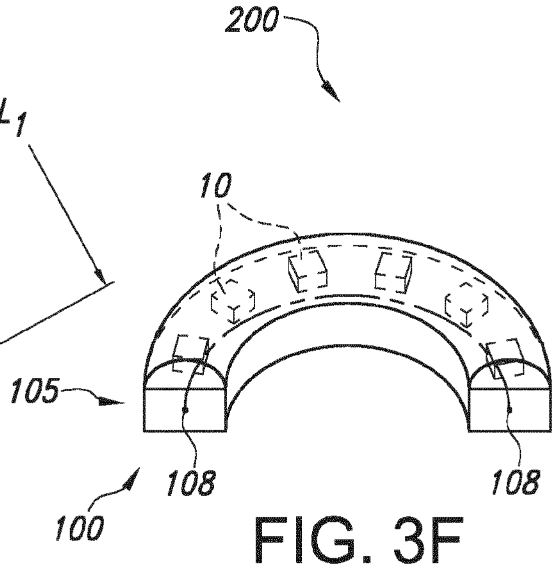

FIG. 3*f* schematically depicts a perspective view of a curved filament. Note that the length axis 108 is now also curved. It may be a body axis of the support 105. The length of this axis is determined along the axis 108. When the filament 200 may be curved in a plane of the filament 200, the virtual plane(s) may also be curved essentially identical to the curvature(s) of the filament 210. In other words, when the support is curved in the plane of the support, the length axis will also be curved, and likewise the first virtual plane and second virtual may be. The length axis in the embodiment in FIG. 3*f* starts at the first face left, follows the curved body axis, and ends at the second face right.

Figure 4:
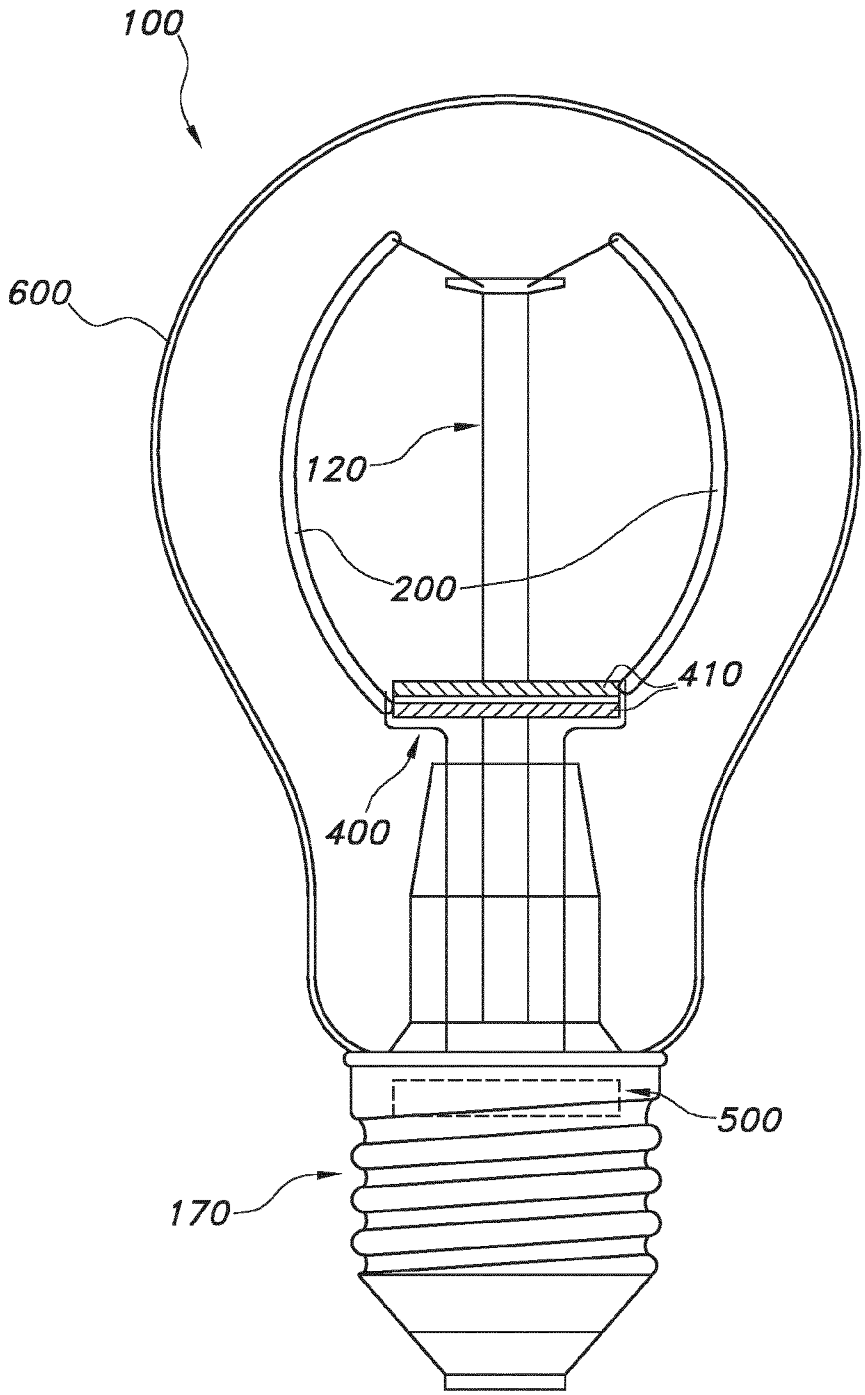
FIG. 4 also shows an embodiment.

FIG. 4 schematically depicts an embodiment of retrofit lamp (being or comprising the light generating device 100).

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating device comprising (i) n filaments, (ii) a power distribution unit, and (iii) electronics; wherein:

each of the n filaments comprises one or more solid state light sources, wherein n≥1, wherein each of the n filaments comprises at least m electrical contacts, wherein m≥2, and wherein the n filaments are configured to generate filament light;

the power distribution unit comprises k electrically conductive tracks separated by electrically insulating material, wherein k≥2;

at least two of the electrical contacts of the n filaments are functionally coupled to at least two different electrically conductive tracks;

the at least two different electrically conductive tracks are functionally coupled to the electronics; and the electronics comprise one or more of a control system, a driver, and a transformer;

wherein the electronics are configured to individually control at least two sets of each at least one filament;

wherein one or more of a color point and a correlated color temperature of a device light is controllable, and the device light comprises the filament light of one or more of the n filaments when in operation; and wherein the electrically conductive tracks are configured parallel to each other, and wherein the power distribution unit has a ring-shape.

2. The light generating device according to claim 1, wherein the electrically insulating material comprises a polymeric material.

3. The light generating device according to claim 1, wherein the electrically insulating material comprises one or more of a glass material, a composite material, and a ceramic material.

4. The light generating device according to claim 1, further comprising a first supporting structure, wherein one or more of the power distribution unit and the first supporting structure are configured to support the n filaments.

5. The light generating device according to claim 4, wherein the power distribution unit at least partly circumferentially surrounds the first supporting structure.

6. The light generating device according to claim 1, wherein n≥2, wherein the electrical contacts comprise first electrical contacts and second electrical contacts, wherein the first electrical contacts of the filaments are functionally coupled to different electrically conductive tracks, and wherein the second electrical contacts of the filaments are functionally coupled to (a) the same electrically conductive track, but different from the different electrically conductive tracks to which the first electrical contacts are functionally coupled, or (b) a mutual electrode external from the power distribution unit; and wherein each filament comprises a plurality of solid state light sources.

7. The light generating device according to claim 6, wherein the mutual electrode is functionally coupled with the electronics via an electrically conductive connection within the supporting structure.

8. The light generating device according to claim 1, wherein the length of the respective tracks is in the range of 70-100% of the length or circumference of the power distribution unit.

9. The light generating device according to claim 1, wherein at least two of the electrically conductive tracks are configured as anodes.

10. The light generating device according to claim 8, wherein the n filaments comprise a first filament and a second filament, wherein the first filament is mechanically and electrically connected to a first electrically conductive track of the at least two different electrically conductive tracks; wherein the second filament is mechanically and electrically connected to the second electrically conductive track of the at least two different electrically conductive tracks; wherein axes of elongations of the respective filaments are configured in planes intersecting at a device axis, and wherein the planes have mutual first angles α selected from the range of 15-180°, and wherein the light generating device has a first axis of elongation and the n filaments have each individually a second axis of elongation, wherein at least two second axes of elongation have different second angles β relative to the first axis of elongation.

11. The light generating device according to claim 8, wherein 3≤k≤6 and wherein n≥3.

12. The light generating device according to claim 8, wherein the at least two of the n filaments are configured to generate filament light having (i) different correlated color temperatures with differences of at least 500 K, or (ii) different colors with color point differences of at least 0.03 for u' and/or at least 0.03 for v'; and wherein the electronics are configured to control the at least two of the n filaments in dependence of one or more of an input signal of a user interface, a sensor signal, and a timer.

13. The light generating device according to claim 1, wherein k≥3, and wherein at least one of the electrically conductive tracks is configured as an antenna.

14. A light generating device according to claim 1, wherein the light generating device is a retrofit lamp.

* * * * *